INVENTORS
MAX FONER
ALVIN C. YORK
BY John R. Walker, III
Attorney

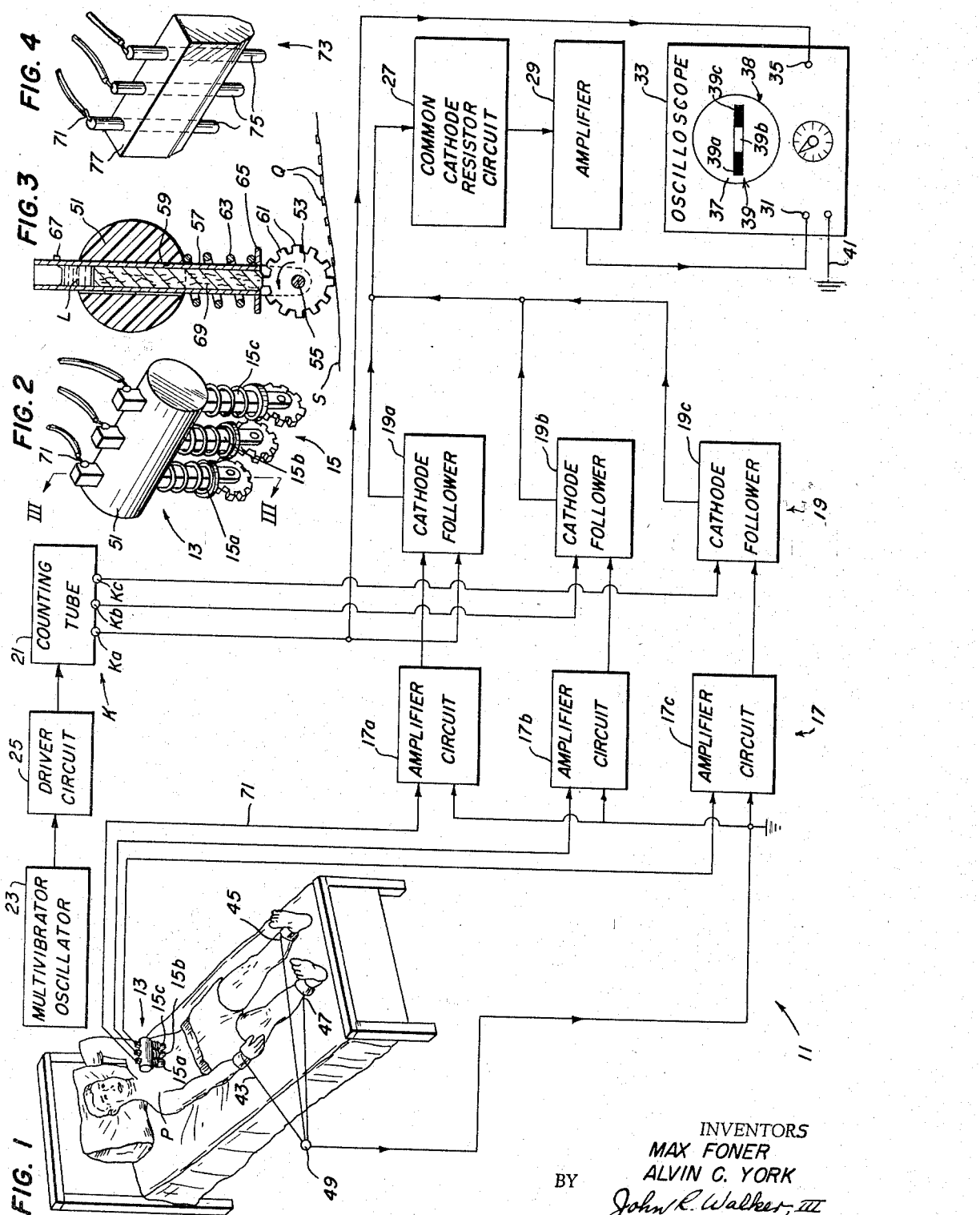

United States Patent Office 3,323,515
Patented June 6, 1967

3,323,515
APPARATUS FOR INDICATING POTENTIALS OF LIVING TISSUE
Max Foner, 312 Stonewall 38112, and Alvin C. York, 2111 Trimble 38104, both of Memphis, Tenn.
Filed May 5, 1964, Ser. No. 364,904
7 Claims. (Cl. 128—2.06)

ABSTRACT OF THE DISCLOSURE

An apparatus which indicates on a phosphorescent screen the relative potentials of a plurality of places on living tissue, and which is particularly useful for measuring cardiac potential. Potential pick-up means having a plurality of electrodes placeable respectively on a plurality of places on the living tissue to pick up the individual potentials, and an electronic switching circuit between the potential pick-up means and an oscilloscope having a phosphorescent screen to make possible an apparently simultaneous comparative showing of the potentials of a plurality of small areas on the living tissue.

Heretofore, apparatus for measuring cardiac potential, which apparatus is commonly known as EKG or electrocardiogram, has had certain limitations. For example, the tracing on the chart for a particular heart will vary depending on where the exploring electrode is placed, the size of the muscle mass, and the position of the heart, among other things. Also, the interpretation of the tracing is not an exact science and depends, to a large extent, on the experience of the physician doing the interpretation. In addition, among the limitations of the electrocardiograph method, and perhaps the chief one, is the fact that definite, even serious, heart disease, such as so-called silent heart attacks, may exist in the presence of a normal or a relatively normal electrocardiogram. Furthermore, the degree of electrocardiographic change does not necessarily mirror the degree of myocardial disease.

The present invention is directed towards overcoming the heretofore mentioned and other limitations and disadvantages of electrocardiographs and other apparatus for indicating the potentials of living tissue.

Thus, one of the objects of the present invention is to provide apparatus for indicating the potentials or electromotive forces of living tissue in such a manner that the abnormal conditions of portions of the living tissue may be easily detected.

A further object is to provide such apparatus which can pick up individually the potentials from a plurality of small areas of living tissue or cardiac muscle and can cause a corresponding plurality of areas on a cathode ray tube to indicate relatively said potentials.

A further object is to provide, in such apparatus, means for giving an apparent simultaneous indication of the potentials of all such areas.

A further object is to provide such apparatus which utilizes the illuminescence of the phosphorscent screen of the cathode ray tube as a basis of relating each area of living tissue to the surrounding areas so that small areas of differences can be detected.

A further object is to provide such apparatus which includes a unique combination of a potential pick-up means, an electronic switching mechanism, and cathode ray tube means, which makes possible an apparently simultaneously comparative showing of the potentials of a plurality of small areas on living tissue.

A further object is to provide a unique potential pick-up means.

A further object is generally to improve the design and construction of apparatus for indicating potentials of living tissue.

The means by which the foregoing and other objects of the present invention are accomplished and the manner of their accomplishment will be readily understood from the following specification upon reference to the accompanying drawings, in which:

FIG. 1 is a diagrammatic view of the apparatus of the present invention shown in use with a patient.

FIG. 2 is a perspective view of the preferred form of the pick-up device of the present invention.

FIG. 3 is an enlarged sectional view taken as on the line III—III of FIG. 2 and showing the device in operation.

FIG. 4 is a perspective view of a modified form of the pick-up device of the present invention.

Figure 5:
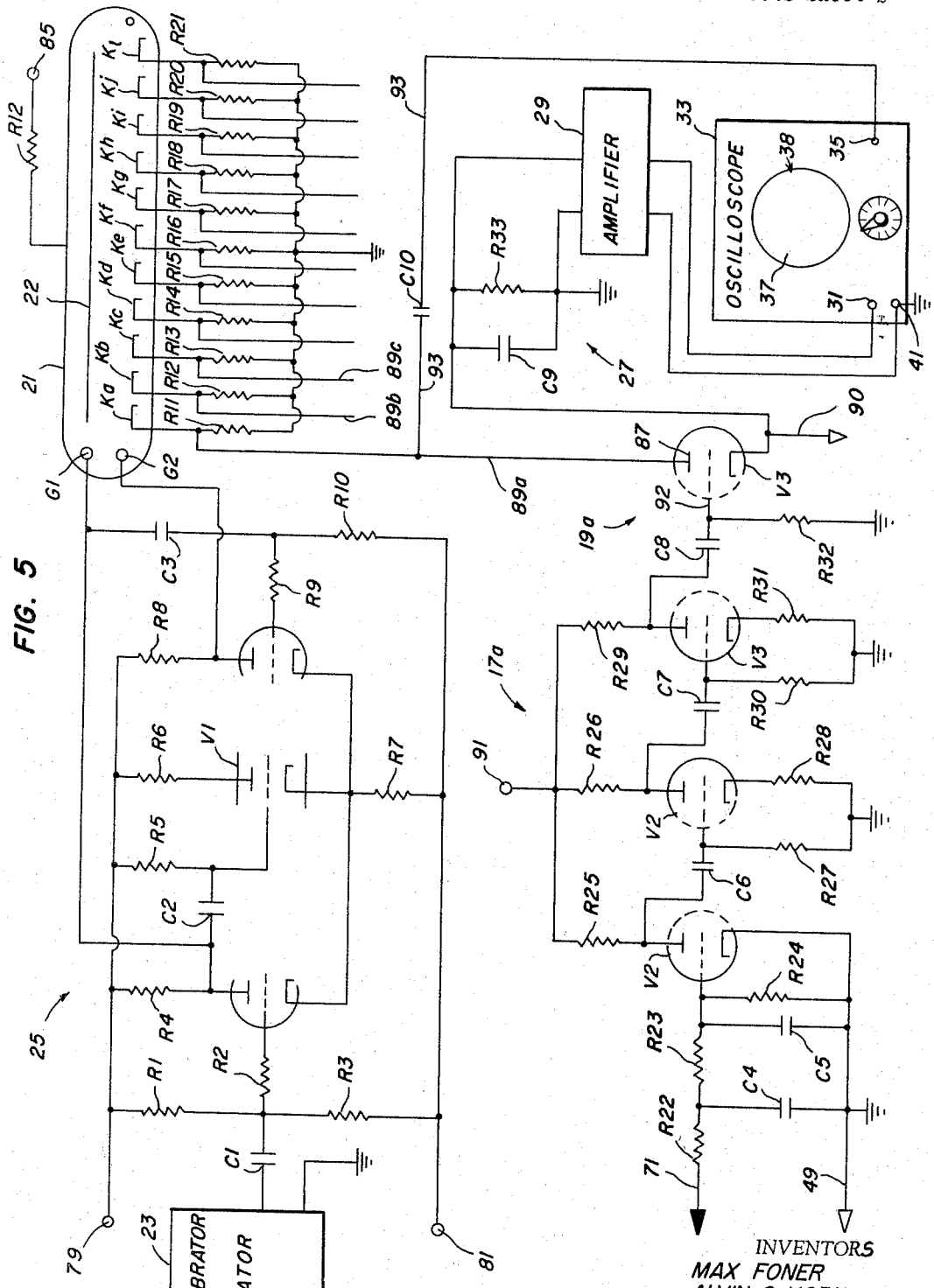
FIG. 5 is a schematic view of portions of the electronic circuitry of the apparatus of the present invention.

Referring now to the drawings in which the various parts are indicated by numerals, in general, the preferred embodiment of the apparatus 11 of the present invention utilizes a unique pick-up device 13, which will be described in more detail later in the specification, and which pick-up device includes a plurality of electrodes 15 that are placed on a plurality of places on the surface of the living tissue to respectively receive a plurality of potentials from said places. In FIG. 1, the above-mentioned plurality are shown as three in number for purposes of illustration, but it will be understood that more or less can be provided without departing from the spirit and scope of the present invention.

As is known by those skilled in the art, the living tissue or the heart muscle produces an electromotive force or electrical potential, and the potential received at the electrodes 15, placed on the chest of the patient over the heart, is a direct reflection of the underlying cardiac muscle, so that abnormal tissue, such as an injury to the heart, will be indicated by the electrode directly thereabove in the form of an opposite potential to that of the normal muscle. In other words, in an area where the muscle tissue in the heart is damaged, there is a so-called current of injury which will appear as a lowering of the potential or voltage on the electrode 15 directly thereabove.

As is known to those skilled in the art, and for the purposes of clarity, the following more detailed explanation is given of what is meant hereinabove by "an opposite potential to that of the normal muscle." This means that the potential is directly opposite in polarity to the potential of a normal muscle portion under consideration. For example, suppose that in the particular area that is being referred to, there is a thick wall of cardiac muscle. In addition, suppose that in this thick wall there is an area of the muscle that is damaged and is not completely through the wall, and the area which is damaged is on the inner portion, and the area which is good is in the outer portion, or vice versa. The area which is damaged has a damaged potential (known in the art as "current of injury"). That is to say, one which is directly opposite in polarity or directly opposite in charge to the potential of a normal portion. Thus, if the normal voltage of that area before any damage occurred, was, for example, one millivolt, and if the damage occurred on the inner portion and the outer portion was not damaged, the inner portion would give a potential which is opposite to the portion which is good so that the overall total potential would be lowered on the electrode over that particular area. Now, turning to another example, where there is a damaged area which is adjacent to a good area, there is a voltage which is an injury current or current of injury as it is well-known to those skilled in the art, which is opposite to the normal current that one normally reads with an electrocardiograph. In other words, with an injury there is a lowering of the potential or voltage, i.e., a current of injury.

The above-mentioned potentials picked up at the respective electrodes 15 are individually respectively fed into a like plurality of amplifier circuits 17 and then respectively into a like plurality of cathode followers 19. Also, operably coupled to cathode followers 19 are the output cathodes K of a counting tube 21 of well-known construction. The cathodes K of counting tube 21 are arranged in a circle, and normally ionization will occur between the anode 22 thereof and one of the cathodes, which is known as the preferred cathode. As is known, when an outside electrical froce is applied in the proper manner to counting tube 21 for the actuation thereof, the ionization will move from one cathode to the next and, since the cathodes are in a circle, will complete a cycle. In FIG. 5, all ten output cathodes K are shown, rather than the abbreviated number of three shown in FIG. 1, since this particular counting tube 21, i.e., a 6476, actually has ten output cathodes. For purposes of clarity, the cathodes K are indicated with a small letter suffix, i.e., K$a$, K$b$, K$c$, etc. In this tube 21, the ionization will advance from K$a$ to K$j$ and then begin again at K$a$. Although this type of tube is commonly known as a counting tube, it will be understood, as will be brought out more fully in the description of the operation of the device to follow later in the specification, that tube 21 actually, in the circuitry of the present invention, acts as a switching device. Counting tube 21 is caused to count or switch in the above-mentioned manner as by means of a multivibrator oscillator and a driver circuit, respectively shown diagrammatically in FIG. 1 as at 23 and 25.

Multivibrator oscillator 23 is of suitable well-known construction and is preferably a free-running multivibrator that generates a square wave. The exact frequency of multivibrator oscillator 23 is not critical, and it has been found that a range from very low frequencies to about 4,000 pulses per second is useful.

The actual connection of counting tube 21 to the cathode followers 19, as heretofore described, is to the respective plates of the cathode followers, and the circuits are so arranged that as the counting tube 21 counts or switches from one output cathode to the next, a pulse, which is applied to the corresponding cathode follower, is switched from one cathode follower to the next. In general, the outputs from the cathode followers 19 are fed into a common cathode resistor circuit, through an amplifier 29, and then into the Z-axis input 31 of an oscilloscope 33.

The output from the first cathode K$a$ of counting tube 21 is fed into the sweep trigger input 35 of oscilloscope 33, so that each time the ionization of counting tube 21 is between K$a$ and anode 22, a sweep begins across the screen 37 of the cathode ray tube 38 of oscilloscope 33. The only time that a signal from electrodes 15 will be passed through cathode followers 19 is when a pulse is applied to the plate of one of cathode followers 19, so that the cathode followers are successively turned on and off with only one cathode follower being on at any period of time. Thus, each time the beam of oscilloscope 33 sweeps across screen 37, each of the cathode followers 19 is turned on and off once, and a signal from each of the electrodes 15 is passed to the oscilloscope so that it will be understood that there is a corresponding area 39 on the screen 37 for each of the electrodes 15. For purposes of clarity, in FIG. 1 the corresponding electrodes 15, amplifier circuits 17, cathode followers 19, output cathodes K, and areas 39 are respectively designated with the same suffix $a$, $b$ or $c$. Thus, electrode 15$a$ feeds into amplifier circuit 17$a$ and from there to cathode follower 19$a$, and thence, when tube 21 is ionized between output cathode K$a$ and anode 22, the signal is fed from cathode follower 19$a$ into the oscilloscope 33 where it appears as an indication on area 39$a$.

Oscilloscope 33 is grounded as at 41, and also the limb leads on the patient are grounded. Thus, as will be seen by referring to FIG. 1, the patient P is preferably provided with the usual limb leads 43, 45, 47 which are respectively connected to one of the patient's arms and to both legs, from where they extend to a common point 49 which is known as an indifferent electrode or zero point that is grounded as shown.

In the example shown in FIG. 1, the portion of the heart muscle directly below electrode 15$b$ is assumed to be abnormal or damaged. Since, as is well-known to those skilled in the art, the electrodes 15$a$, 15$b$ and 15$c$, which are on the surface of the patient P directly above the heart, will pick up a potential which is a direct reflection of the underlying cardiac muscle, and since an abnormal or damaged portion will give a so-called current of injury or a potential which is directly opposite in polarity to the potential of the normal muscle portion, resulting in a reduced overall total potential, this will be indicated on the screen 37 as a difference in appearance or light intensity of the area 39$b$ as compared to the other areas 39$a$ and 39$c$. In other words, by the use of the Z-axis of the oscilloscope 33, the illuminescence of the phosphorescent screen (which is related to voltage in a linear fashion) is being used as a basis of relating each area of tissue to its adjacent tissue to detect small areas of differences. For example, the areas 39$a$ and 39$c$ will appear as darker areas on the screen 37, and the area 39$b$ will appear as a lighter area, or vice versa, the areas 39$a$ and 39$c$ can be made to appear as lighter areas and the area 39$b$ as a darker area by changing the circuit in a well-known manner. It can be seen that this gives a very quick and easily readable picture which appears simultaneous on the screen 37 since the switching is so fast and the illumination screen holds its appearance for a short time. Stated another way, on the screen 37 will appear a picture of the heart showing the comparison between the abnormal tissue and the normal tissue, and with the picture being broken down into a number of small components. Thus, in actual practice, the number of electrodes 15 will probably exceed greatly the three shown in FIG. 1, which are for illustration purposes only. It will be understood that if two adjacent areas are abnormal, they can be detected since with a great number of electrodes over a small area, as opposed to just a few electrodes over a large area, there will be contrast, that is, where the damage is it will show up differently from the adjacent areas. Thus, if the device is set up so that the normal area will give more intense areas on the screen 37, then the less intense areas will be the damaged area.

In the preferred embodiment of pick-up device 13, shown in FIGS. 1, 2 and 3, the device is a movable one that can be moved along the surface of the patient P to provide an infinite number of pick-up points. Pick-up device 13 comprises an insulated base 51 which supports the electrodes 15 in side-by-side spaced apart relationship. The electrodes are substantially identical, and the following description of one will suffice for all. Each electrode 15 comprises a wheel 53 rotatably mounted on an axle 55 between the forked lower end of a hollow conductor 57 that slidably extends upwardly through a bore 59 in base 51. Around the periphery of wheel 53 are a plurality of radially extending and circumferentially spaced projections 61 that are adapted to successively contact the surface S of the patient P as the wheel is rolled therealong, as best seen in FIG. 3. Wheel 53 is yieldably held against the surface S as by means of a spring 63 disposed around conductor 57 and extending between base 51 and a shoulder 65 fixedly attached to the conductor adjacent the lower end thereof. A stop 67, provided adjacent the upper end of conductor 57, limits downward movement of the conductor relative to base 51. It will be understood that the pick-up device 13, when being operated, is supported as by grasping the base 51, with compression being exerted on spring 63 so that the wheel 53 will remain in good contact with surface S regardless of irregularities in the surface. In the interior of conductor 57 is preferably provided means for applying the standard EKG jelly or other material, such as a salt solution in a non-greasy base, to insure good electrical conductivity between the patient P and wheel 53. A preferred form of this above-mentioned means is best seen in FIG. 3, wherein it will be seen a wick 69 is provided in conductor 57. Wick 69 is in contact adjacent the lower end thereof with the projections 61 as they move past the wick so that the liquid L, such as the salt solution heretofore mentioned, which is carried in conductor 57 above wick 69, is transmitted by the wick to projections 61 and thence transmitted at spaced intervals or places along the surface S, as indicated as at Q. It will be understood that by having the projections 61 in circumferentially spaced relationship, rather than having a solid wheel, the liquid L deposited on the surface S will not cause a continuous unbroken strip of electrical conducting material on the surface S. Thus, as each projection 61 contacts the surface S, only that potential directly below the particular projection is picked up. It will be understood that the current flows from each projection 61, through wheel 53, axle 55, conductor 57, to a lead 71 connected to conductor 57, from where it is fed into an amplifier circuit 17.

A modified or stationary pick-up device 73 is shown in FIG. 4, which has a plurality of stationary electrodes 75 that are supported in spaced apart relationship in the insulated base 77. The respective leads 71 are attached to electrodes 75 adjacent the upper ends thereof and the electrodes are adapted to contact the surface of the patient at the lower ends thereof. Although only three electrodes 75 are provided, it will be understood that a great number of electrodes can be provided without departing from the spirit and scope of the present invention.

In FIG. 5, portions of the circuitry are shown more in detail, wherein it will be seen that the output from the multivibrator 23 is coupled through capacitor C1 to the driver circuit 25, which includes a tube V1 that is preferably a triple triode. Driver circuit 25 is a suitable type of well-known driver circuit, and the preferred values of the components are listed later in the specification. It should be pointed out that at the terminal indicated as at 79, a positive voltage of 45 volts is applied from a suitable power supply, not shown, and also at the terminal 81 a negative voltage of 225 volts is applied. The driver circuit 25 develops a dual pulse which is applied to the two guide connections G1 and G2 of the counting tube 21. The time difference between the two pulses from the driver circuit 25 causes the counting tube 21 to step or switch, that is, to move its ionization from the output cathode Ka to Kb, etc., as heretofore described. A voltage of about 25 volts is developed across the cathode resistor (R11–R21) of only the one output cathode which has ionization between it and the common anode 22 of the counting tube 21. It should be pointed out that a positive voltage of about 425 volts is preferably supplied to terminal 85 by a suitable power supply, not shown.

The 25 volt pulse which is respectively developed across the resistors (R11–R21) is respectively applied to the plates 87 of the corresponding cathode followers 19. For purposes of clarity, in FIG. 5 only one of the cathode followers is shown, namely, 19a, and its corresponding amplifier circuit 17a, with plate 87 being connected to cathode Ka by lead 89a. However, it will be understood that the other cathodes Kb, Kc, etc. are respectively connected to the plates 87 of their corresponding cathode followers 19b, 19c, etc. similarly as by leads 89b, 89c, etc. All of the cathodes of cathode follower tube V3 are connected through a lead 90.

The amplifier circuits 17a, 17b, etc. are of any suitable well-known construction and are substantially identical. Thus, the following description of amplifier circuit 17a should suffice for all. The signal from the electrode 15a which includes an input filter circuit and three triode is fed through a lead 71 into the amplifier circuit 17a amplifier sections where the signal is amplified. Preferably, two 12AX7 tubes are used for V2 and V3, which tubes are dual triode tubes. Thus, both sections of one tube, that is, V2, and one section of a second tube, that is, V3, are used for the amplifier circuits. A positive voltage of 425 volts is preferably supplied to terminal 91, as by means of a suitable power supply, not shown. The output from the amplifier 17a is coupled to the control grid 92 of the cathode follower 19a, which is preferably the second section of the tube V3. The only time that the cathode follower 19a can conduct current is when the 25 volt pulse from the counting tube 21 is applied to plate 87, and that is only when the ionization in counting tube 21 is between the output cathode Ka and anode 22, as heretofore described.

The output from the particular one of the cathode followers 19a, 19b, etc. which is turned on, as heretofore described, is fed into the common cathode resistor circuit 27 and applied across cathode resistor R33. The output from common cathode resistor circuit 27 is then fed through an amplifier 29 of suitable well-known construction which further amplifies the signal and is fed into the Z-axis input 31 of oscilloscope 33.

The output from cathode Ka of counting tube 21 is fed into sweep trigger input 35 as by means of the lead 93 that has interposed therein a capacitor C10 and which lead is connected at one end to lead 89a and at the other end to sweep trigger input 35. The purpose of capacitor C10 is to deliver a sharp spiked pulse to trigger the scope sweep.

The following values for the various components shown in FIG. 5 are given for illustrative purposes only, and not by way of limitation:

| | | |
|---|---|---|
| R1 | megohm | 1 |
| R2 | ohms | 220,000 |
| R3 | do | 33,000 |
| R4 | do | 68,000 |
| R5 | megohm | 1 |
| R6 | ohms | 27,000 |
| R7 | do | 2,700 |
| R8 | do | 56,000 |
| R9 | do | 220,000 |
| R10 | do | 470,000 |
| R11 | do | 100,000 |
| R12 through R21 | do | 560,000 |
| R22 | do | 1,000 |
| R23 | do | 1,000 |
| R24 | do | 270,000 |
| R25 | do | 470,000 |
| R26 | do | 470,000 |
| R27 | do | 33,000 |
| R28 | do | 5,600 |
| R29 | do | 470,000 |
| R30 | do | 68,000 |
| R31 | do | 5,600 |
| R32 | do | 68,000 |
| R33 | do | 1,000 |
| C1 | mmf | 100 |
| C2 | mmf | 150 |
| C3 | mmf | 68 |
| C4 | mf | .005 |
| C5 | mf | .005 |
| C6 | mf | .5 |
| C7 | mf | .5 |
| C8 | mf | .5 |
| C9 | mf | .001 |
| C10 | mmf | 120 |
| V1 | | 6EZ8 |
| V2 | | 12AX7 |
| V3 | | 12AX7 |
| Counting tube 21 | | 6476 |

Although the invention has been described in some detail by way of illustration and example for purposes of clarity or understanding, it is to be understood that it is not to be so limited since changes and modifications may be made therein which are within the full intended scope of this invention as hereinafter claimed.

We claim:

1. Apparatus for indicating the relative potentials of a plurality of places on living tissue comprising potential pick-up means including a plurality of electrodes placeable respectively on said plurality of places for respectively picking up individual potentials, indicating means including a phosphorescent screen having a like plurality of areas thereon corresponding to said electrodes, and means operably connected to said indicating means and said potential pick-up means for varying the illuminescence of said screen in said areas thereon responsive to the potentials picked up by said electrodes corresponding thereto.

2. The apparatus of claim 1 in which each of said electrodes comprises a rotatably mounted wheel having a plurality of circumferentially spaced projections around the periphery thereof adapted to successively contact the living tissue as said wheel is rolled therealong.

3. Apparatus for detecting abnormal conditions of cardiac muscle comprising potential pick-up means including a plurality of electrodes placeable on the surface of the patient above the cardiac muscle for respectively picking up individual potentials from the portions of the cardiac muscle therebelow, cathode ray tube means including a screen having a like plurality of areas thereon corresponding to said electrodes, and means operably connected to said cathode ray tube means and said potential pick-up means for causing said areas on said screen to indicate relatively said potentials.

4. Apparatus for indicating the relative potentials of a plurality of places on living tissue comprising cathode ray tube means including a phosphorescent screen having a plurality of areas thereon and an electron beam impinging on said screen, potential pick-up means having a plurality of electrodes respectively corresponding to said plurality of areas for respectively placing on said plurality of places on said living tissue to respectively receive a plurality of potentials from said places, circuit means operably connected to said potential pick-up means and said cathode ray tube means for causing said beam to successively sweep across said areas and as said beam sweeps across said areas to cause the intensity of said beam to vary reponsive to the potentials picked up by the corresponding said electrodes whereby the illuminescence of said screen can be used as a basis for relating each said area of said living tissue to its adjacent tissue.

5. Apparatus for indicating the relative potentials of a plurality of places on living tissue comprising cathode ray tube means including a phosphorescent screen having a plurality of areas thereon, an electron beam impinging on said screen, a Z-axis input to said beam, sweep means for said beam including a sweep triggering input, and a ground for said cathode ray tube means; potential pick-up means having a plurality of electrodes respectively corresponding to said plurality of areas for respectively placing on said plurality of places on said living tissue to respectively receive a plurality of potentials from said places, means connectable to said living tissue in substantially spaced relationship to said electrodes to establish a zero electrical reference point, means coupled between said reference point and said ground, counting tube means including a plate and a plurality of output cathodes corresponding to said plurality of electrodes, means operably coupled to said counting tube means for causing said counting tube means to cycle and draw current therethrough successively between said plate and said output cathodes, means operably coupled between one of said output cathodes and said sweep triggering input for causing said beam to sweep across said areas of said screen each time said counting tube means cycles; circuit means operably coupled to said counting tube means, to said electrodes, and to said Z-input, and including a plurality of cathode followers corresponding to said plurality of electrodes and respectively operative responsive to cycling of said counting tube means for giving comparative indications on said screen at the respective said areas thereon of said potentials corresponding to said areas.

6. The apparatus of claim 5 in which each of said electrodes comprises a rotatably mounted wheel having a plurality of circumferentially spaced projections around the periphery thereof adapted to successively contact the living tissue as said wheel is rolled therealong, resilient means operably coupled to said wheel for yieldably urging said wheel against the living tissue, and means successively contacting said projections for supplying material thereto to cause good electrical contact between said projections and the living tissue.

7. A potential pick-up device for picking up potentials from living tissue comprising an insulated base having a plurality of vertical bores therethrough, a like plurality of electrodes mounted on said base in laterally spaced relationship; each of said electrodes including a hollow conductor slidably mounted in one of said bores, a wheel rotatably mounted adjacent the lower end of said conductor and having a plurality of circumferentially spaced projections around the periphery thereof adapted to successively contact the living tissue as said wheel is rolled therealong, resilient means interacting between said base and said conductor for yieldably urging said wheel against the living tissue, and wick means in said hollow conductor saturated with an electricity conducting material and successively contacting said projections to cause good electrical contact between said projections and the living tissue.

References Cited

UNITED STATES PATENTS

| | | | |
|---|---|---|---|
| 1,049,759 | 1/1913 | Oliver | 128—405 X |
| 1,728,368 | 9/1929 | Saxer | 128—24.4 |
| 1,811,764 | 6/1931 | Sherwood | 128—405 X |
| 2,409,749 | 10/1946 | Foulger et al. | 128—2.06 |
| 2,998,568 | 8/1961 | Schlessel | 128—2.06 X |
| 3,067,738 | 12/1962 | Karlik | 128—57 |
| 3,163,166 | 12/1964 | Brant et al. | 128—405 |
| 3,186,403 | 6/1965 | Bassett | 128—2.06 |
| 3,217,706 | 11/1965 | Sullivan | 128—2.1 |

RICHARD A. GAUDET, *Primary Examiner.*

S. BRODER, *Assistant Examiner.*